US006748172B2

(12) United States Patent
Lyu

(10) Patent No.: US 6,748,172 B2
(45) Date of Patent: Jun. 8, 2004

(54) MULTI-CHANNEL LIGHT SOURCE GENERATOR IN A WDM OPTICAL COMMUNICATION SYSTEM

(75) Inventor: Gap Youl Lyu, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 552 days.

(21) Appl. No.: 09/746,635

(22) Filed: Dec. 21, 2000

(65) Prior Publication Data

US 2001/0015840 A1 Aug. 23, 2001

(30) Foreign Application Priority Data

Dec. 27, 1999 (KR) .......................... 1999-62440

(51) Int. Cl.$^7$ ............................... H04J 14/02
(52) U.S. Cl. ............... 398/79; 398/82; 398/84; 398/87; 398/91; 398/92; 398/81; 398/140; 398/141; 398/157; 398/158; 359/341; 359/337; 385/24; 385/37; 385/27; 385/39; 385/122; 372/6; 372/70; 372/23; 372/71; 372/68
(58) Field of Search .................. 398/79, 82, 84, 398/87, 91, 92, 81, 140, 141, 157, 158; 359/341, 337; 385/24, 37, 27, 39, 122; 372/6, 70, 23, 71, 68

(56) References Cited

U.S. PATENT DOCUMENTS 5,564,832 A * 10/1996 Ball et al. .................. 374/161
5,892,781 A * 4/1999 Pan et al. ....................... 372/6
5,910,962 A   6/1999 Pan et al. ....................... 372/6

OTHER PUBLICATIONS

J. Hubner et al., "Five wavelength DFB fibre laser source for WDM systems", Electronic Letters, Jan. 1997, vol. 33, No. 2, pp. 139–140.

* cited by examiner

Primary Examiner—Leslie Pascal
Assistant Examiner—Hanh Phan
(74) Attorney, Agent, or Firm—Seed IP Law Group PLLC

(57) ABSTRACT

A multi-channel light source generator has a pumping laser source for generating a pumping laser having a predetermined wavelength, a multi-channel light source generating device for generating multi-channel light sources using the pumping laser, a light separating device for separating the pumping laser and the multi-channel light sources, a demultiplexing device for separating the multi-channel light sources into a plurality of individual light sources, an intensity adjusting device for adjusting an intensity of the individual light sources, and a multiplexing device for combining the individual light sources outputted from the intensity adjusting device.

6 Claims, 1 Drawing Sheet

MULTI-CHANNEL LIGHT SOURCE GENERATOR IN A WDM OPTICAL COMMUNICATION SYSTEM

TECHNICAL FIELD

The invention relates generally to a WDM (Wavelength Division Multiplexing) optical communication system, more particularly, to a multi-channel light source generator in a WDM optical communication system using a single multiplexer/demultiplexer.

BACKGROUND OF THE INVENTION

In order to increase the transmit capacity in the field of optical communications, study on a WDM scheme using a multi-channel light source has recently been actively made. At this time, the multi-channel light source in the WDM system employs a scheme by which an optical signal to be transmitted is applied to its assigned wavelength. A light source now widely used is a DFB-LD (Distributed Feedback Laser Diode). However, the laser diode is expensive and also requires its wavelength to be precisely controlled, since it must control the temperature to adjust its output wavelength.

FIG. 1 is a diagram of a conventional multi-channel light source generator. A plurality of multi-channel optical fiber lasers 12 which are serially connected, are connected to a pumping laser 11. A first WDM coupler 13 directs the pump light through the multi-channel optical fiber lasers 12 from the pumping laser 11, some of which are transmitted to an optical fiber 15 and some of which are inputted to an erbium-doped optical fiber 16 through an optical isolator 14 so that they can be amplified. Both the lights transmitted through the optical fiber 15 and the erbium-doped optical fiber 16 are combined at a second WDM coupler 17 and is then transmitted to optical isolator 18, which produces multi-channel output light 19.

At this time, as many as the multi-channel optical fiber lasers are connected, the internal loss of the optical fiber laser is increased. Also, as the light approaches the wavelength of the pump laser, the intensity of the multi-channel output light is reduced. However, this has a drawback that the quality of the transmittance is reduced since optical signal versus noise ratio is increased in a WDM optical transmit system using a WDM light source.

SUMMARY OF THE INVENTION

The present invention is contrived to solve the problems described above and the purpose of the disclosed embodiments of the present invention to provide a multi-channel light source generator in a WDM optical communication system, capable of outputting its pump light having the same intensity, reducing its intensity of noise and easily controlling the intensity of lights depending on respective wavelengths.

In order to accomplish the foregoing, a multi-channel light source generator in a WDM optical communication system according to a first aspect of the present invention is provided to include a pumping laser source for generating a pumping laser having a predetermined wavelength, a multi-channel light source generating means for generating multi-channel light sources using the pumping laser, a light separating means for separating the pumping laser and the multi-channel light sources, a demultiplexing means for separating the multi-channel light sources into a plurality of individual light sources, an intensity adjusting means for adjusting an intensity of the individual light sources, and a multiplexing mean for combining the individual light sources outputted from the intensity adjusting means.

Preferably, the demultiplexing means and the multiplexing means are comprised of a single multiplexing/demultiplexing means.

More preferably, the generator further comprises a reflecting means for redirecting the pumping laser separated by said light separating means to the multi-channel light source generating means.

Also, according to a second aspect of the present invention, a multi-channel light source generator in a WDM optical communication system is provided to include a multi-channel light source generating means for generating multi-channel light sources using a pumping laser and erbium-doped optical fiber Bragg gratings, a light separating means for separating the signal from the multi-channel optical fiber Bragg gratings into the multi-channel light source and a pumping light, a reflecting means for redirecting the pumping light separated by the light separating means to the optical fiber Bragg gratings, a demultiplexing means for separating the multi-channel light sources into individual light sources, a light attenuation means for individually attenuating the light signals separated by the individual light sources so that the intensity of the light can be made constant, and a multiplexing means for combining the individual light sources outputted from the light attenuation means.

Preferably, the de-multiplexing means and the multiplexing means are comprised of a single multiplexing/demultiplexing means.

More preferably, the reflecting means is a pumping light reflecting coating element.

BRIEF DESCRIPTION OF THE DRAWINGS

The aforementioned aspects and other features of the present invention will be explained in the following description, taken in conjunction with the accompanying drawings, wherein.

DETAILED DESCRIPTION OF THE INVENTION

A multi-channel light source generator in a WDM optical communication system according to a preferred embodiment of the present invention will be described in detail with reference to an accompanying drawing.

Figure 1:
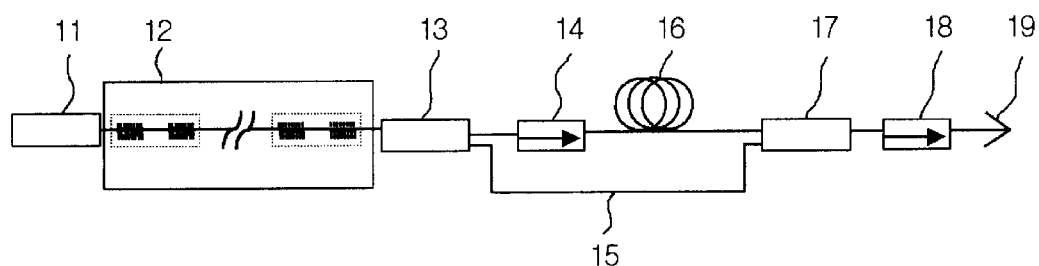
FIG. 1 is a diagram of a conventional multi-channel light source generator.
Figure 2:
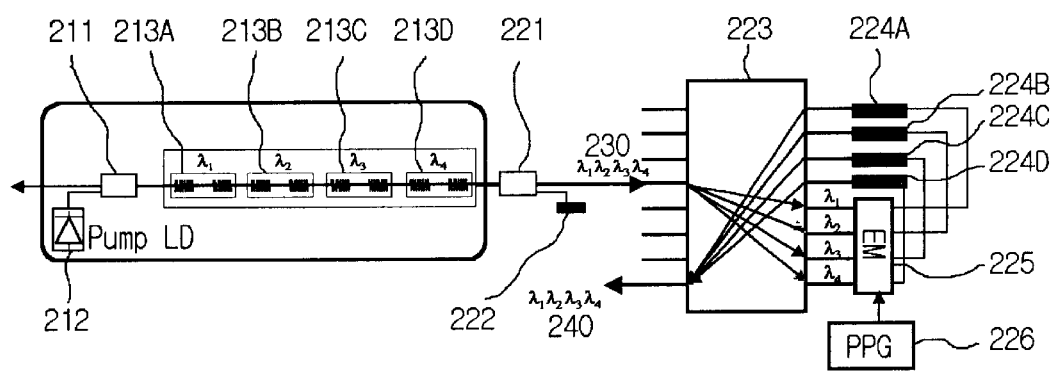
FIG. 2 is a diagram of a multi-channel light source generator according to one preferred embodiment of the present invention.

FIG. 2 is a diagram of a multi-channel light source generator in a WDM optical communication system according to one preferred embodiment of the present invention.

A single pumping laser source 212 outputs a pump light oscillating at 980 nm or at 1480 nm to a WDM optical coupler 211. The WDM optical coupler 211 directs the pumping light from the pumping laser, some of which pass through erbium-doped multi-channel optical fiber Bragg gratings 213A, 213B, 213C and 213D and some of which are outputted. The multi-channel light sources from the multi-channel optical fiber Bragg gratings are separated by channels by means of a multiplexer/demultiplexer 223 and are then signal-processed at an optical modulator 225 and optical attenuators 224A, 224B, 224C and 224D by respective light sources. Thereafter, the light sources are multiplexed at the multiplexer/demultiplexer 223 again, thus producing multi-channel light sources.

The present invention can implement a simplified structure and also can reduce manufacturing cost since it employs a single multiplexer/demultiplexer to multiplex or demultiplex multi-channel light sources. Further, the present invention can minimize cross talk of channels since the light source separated by means of a single multiplexer/demultiplexer increase the effect of an optical filtering.

Meanwhile, the WDM coupler 221 acts to separate the wavelengths of a the pumping laser source 212 and the multi-channel light sources, which includes a pumping light reflecting coating element 222 allowing the intensity of the pumping laser remained after the pumping to be incident into the erbium-doped multi-channel optical fiber Bragg gratings 213A, 213B, 213C and 213D again. Thereafter, when the pumping light reflecting coating element 222 is used, multiplexed light sources 230 inputted to the multiplexer/demultiplexer 223 through a single optical fiber can be outputted with the same light intensity. As the multiplexed light sources 230 do not include any pumping lights, the noise factor depending on the intensity of the pumping light can be minimized. Therefore, the present invention can improve the quality of transmission since it can reduce light signal versus noise ratio in the WDM transmission system using a wavelength division multiplexing laser source.

Further, in a case of the light source 240 that is outputted after being multiplexed at the multiplexer/demultiplexer, the intensity of the light can be easily controlled based on respective wavelengths since it is controlled by use of the 224A, 224B, 224C and 224D light attenuators. Also as the WDM optical coupler 211 can produce a light output in addition to the output light source 240 from the multiplexer/demultiplexer, one output can be used for a system transmission apparatus and the other output can be connected for a multi-channel light source monitoring control so that its operating state can be easily understood.

According to the present invention as mentioned above, the multi-channel light sources could be outputted with the same intensity since the reflecting coating element redirects the pumping light of the multi-channel light sources outputted from the plurality of optical fiber Bragg gratings to the optical fiber Bragg gratings. Also the noise component depending on the intensity of the pumping light can be minimized since the multi-channel light sources demultiplexed do not include the pumping light. Further, the intensity of light by respective wavelengths can be easily controlled since the intensity of light is controlled by individual light sources after the multiplexed multi-channel light sources are demultiplexed by the individual light sources. Also a simplified structure can be implemented and its manufacturing cost can be reduced since a single multiplexer/demultiplexer performs a multiplexing operation and a demultiplexing operation.

The present invention has been described with reference to a particular embodiment in connection with a particular application. Those having ordinary skill in the art and access to the teachings of the present invention will recognize additional modifications and applications within the scope thereof.

It is therefore intended by the appended claims to cover any and all such applications, modifications, and embodiments within the scope of the present invention.

What is claimed is:

1. A multi-channel light source generator in a WDM optical communication system, comprising:
   a pumping laser source for generating a pumping laser having a predetermined wavelength;
   a multi-channel light source generating means for generating multi-channel light sources using said pumping laser;
   a light separating means for separating said pumping laser and said multi-channel light sources;
   a demultiplexing means for separating said multi-channel light sources into a plurality of individual light sources;
   an intensity adjusting means for adjusting an intensity of said individual light sources; and
   a multiplexing mean for combining said individual light sources outputted from said intensity adjusting means.

2. The multi-channel light source generator according to claim 1, wherein said demultiplexing means and said multiplexing means are comprised of a single multiplexing/demultiplexing means.

3. The multi-channel light source generator according to claim 1, further comprising a reflecting means for redirecting said pumping laser separated by said light separating means to said multi-channel light source generating means.

4. A multi-channel light source generator in a WDM optical communication system, comprising:
   a multi-channel light source generating means for generating multi-channel light sources using a pumping laser and a plurality of erbium-doped optical fiber Bragg gratings;
   a light separating means for separating the signal from the multi-channel optical fiber Bragg gratings into the multi-channel light source and a pumping light;
   a reflecting means for redirecting the pumping light separated by the light separating means to the optical fiber Bragg gratings;
   a demultiplexing means for separating the multi-channel light sources into individual light sources;
   a light attenuation means for individually attenuating the light signals separated by the individual light sources so that the intensity of the light can be made constant; and
   a multiplexing means for combining the individual light sources outputted from the light attenuation means.

5. The multi-channel light source generator according to claim 4, wherein said demultiplexing means and said multiplexing means are comprised of a single multiplexing/demultiplexing means.

6. The multi-channel light source generator according to claim 4, wherein said reflecting means is a pumping light reflecting coating element.

* * * * *